(12) United States Patent
Rogge et al.

(10) Patent No.: US 9,908,484 B2
(45) Date of Patent: Mar. 6, 2018

(54) SELF-ADJUSTING LATCHING CONNECTION

(71) Applicant: GM GLOBAL TECHNOLOGY OPERATIONS LLC, Detroit, MI (US)

(72) Inventors: Andreas Rogge, Ruesselsheim (DE); Alexander Mueller, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1 day.

(21) Appl. No.: 15/149,819

(22) Filed: May 9, 2016

(65) Prior Publication Data

US 2016/0325696 A1     Nov. 10, 2016

(30) Foreign Application Priority Data

May 8, 2015   (DE) .......................... 10 2015 005 965

(51) Int. Cl.
*B60R 13/02*     (2006.01)
*B60R 13/04*     (2006.01)

(52) U.S. Cl.
CPC .................................. *B60R 13/04* (2013.01)

(58) Field of Classification Search
CPC ........................... B60R 13/0206; B60R 13/04
USPC ........................................................ 296/1.08
See application file for complete search history.

(56) References Cited

U.S. PATENT DOCUMENTS

| 5,288,530 | A | 2/1994 | Maki et al. |
| 8,469,438 | B2 * | 6/2013 | Mazur ................. B60R 13/0206 24/293 |
| 8,844,992 | B1 * | 9/2014 | Noga .................. B60R 13/0206 24/289 |
| 9,205,786 | B2 * | 12/2015 | Takayama ............... B60R 13/04 |
| 2009/0089987 | A1 | 4/2009 | Hauser |
| 2012/0074280 | A1 | 3/2012 | Hayashi |

FOREIGN PATENT DOCUMENTS

| DE | 10117213 A1 | 12/2002 |
| DE | 102011004784 A1 | 8/2012 |
| DE | 102012019808 A1 | 3/2013 |

OTHER PUBLICATIONS

Great Britain Patent Office, Great Britain Search Report for Great Britain Application No. 1606599.7, dated Oct. 31, 2016.

* cited by examiner

*Primary Examiner* — Pinel E Romain
(74) *Attorney, Agent, or Firm* — Lorenz & Kopf LLP

(57) ABSTRACT

A self-adjusting latching connection include a first component having a latching projection, and a second component having an opening into which the latching projection can be inserted in a mating direction and latched in a final position on a base, on which one of the two components is movably guided transverse to the mating direction between a resting position and a locking position. A spring acts on the one component in the direction of the resting position, and a bolt detachably fixes the one component in the locking position.

14 Claims, 3 Drawing Sheets

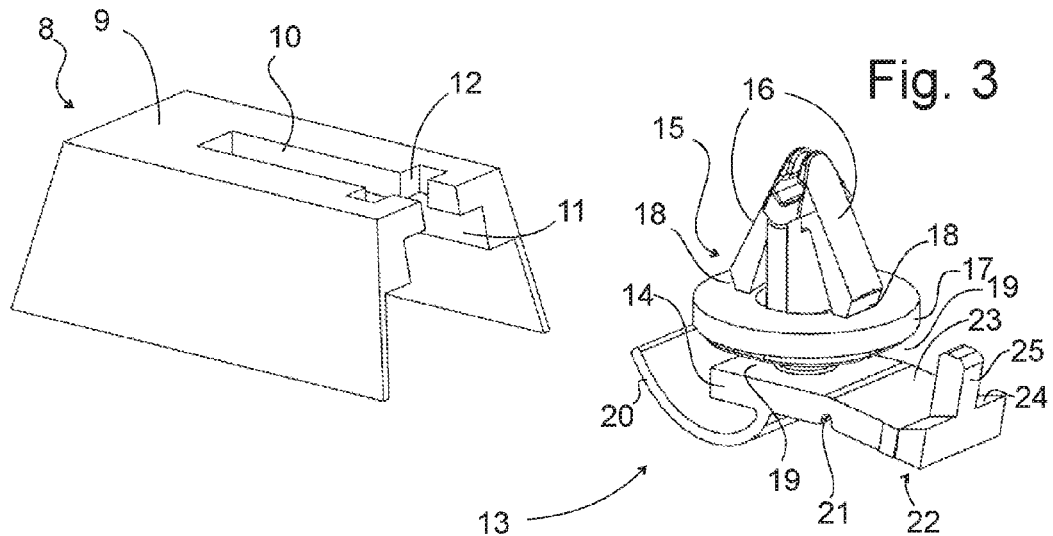
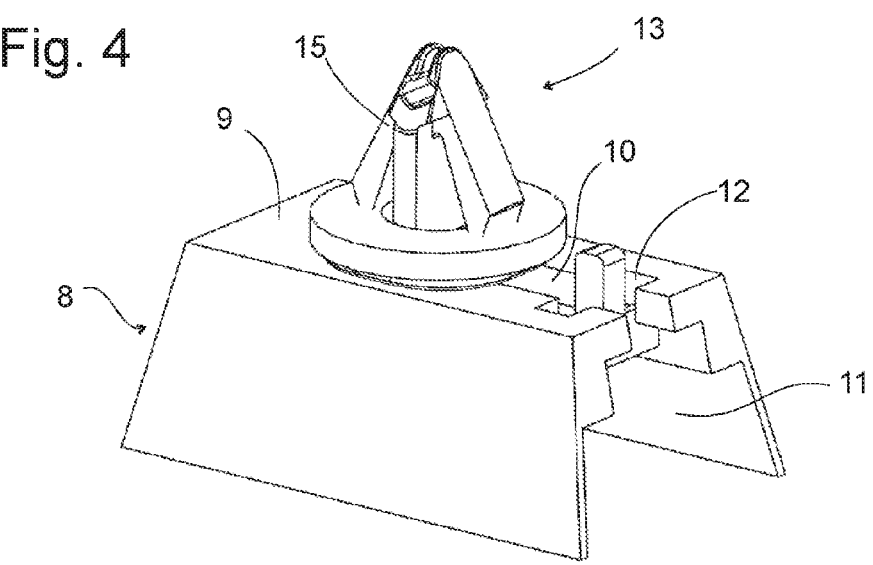
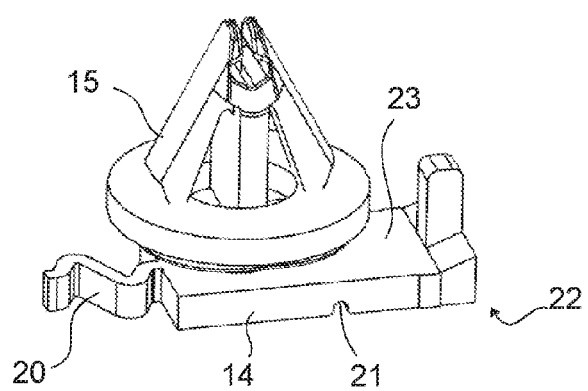

SELF-ADJUSTING LATCHING CONNECTION

CROSS-REFERENCE TO RELATED APPLICATION

This application claims priority to German Patent Application No. 102015005965.3, filed May 8, 2015, which is incorporated herein by reference in its entirety.

TECHNICAL FIELD

The present disclosure pertains to a latching connection with a first component, which includes a latching projection, and a second component, which has an opening into which the latching projection can be inserted in a mating direction and latched in a final position, in particular for attaching a cladding element to a motor vehicle body.

BACKGROUND

DE 10 2012 019 808 A1 discloses a latching connection that makes it possible to fix the cladding element in various positions staggered in the mating direction by providing several latching projections, which each interact in various positions of the two components staggered in the mating direction.

An option to adjust in the mating direction is of interest when adjacent cladding elements are to be mounted flush, which is most often the case in particular when both cladding elements are painted body panels. Decorative elements like chrome trims, whose color deviates from the painted cladding elements, are most often not flush, but rather mounted so as to project over adjacent cladding elements, so that the avoidance of a step in the surface contour is less crucial for an aesthetic overall impression than the clean design or avoidance of a joint between the adjoining cladding elements.

SUMMARY

The present disclosure provides a latching connection that enables a rapid, and yet visually attractive assembly of such cladding elements with a controlled or insignificant joint width. In an embodiment of the present disclosure, a self-adjusting latching connection includes a first component having a latching projection, and a second component having an opening into which the latching projection can be inserted in a mating direction and latched in a final position to a base, on which one of the two components is movably guided transverse to the mating direction between a resting position and a locking position. A spring acts on the one component in the direction of the resting position, and a bolt detachably fixes the one component in the locking position.

Such a latching connection makes it possible to assemble the other component by first inserting the latching projection into the opening, after which the bolt is released, so as to displace the other component, driven by the spring. The position here reached by the other component can be determined via direct impact with another part, in particular a cladding element, so that upon conclusion of assembly, the other component and the cladding element directly contact each other without any visible joint between them; however, it would also be conceivable to provide spacers in a hidden location, which prescribe the width of a joint between the other component and the cladding element.

The bolt can be shifted preferably in the mating direction in order to release the fixation of the one component. In particular, the other component can be shaped so as to shift the bolt while inserting the latching projection into the opening, and thereby automatically release the displacement in the direction of the resting position without the necessity of a separate assembly step. The one component should be guided in a slit in a wall of the base. In particular, the base can be shaped like a box, wherein this wall can then form a longitudinal wall of the box.

In order to simplify the assembly of the components, the slit can be open toward one end face of the base, and the one component can be insertable into the slit via this open end face. In order to facilitate an unlocking by the other component while inserting the latching projection into the opening, an actuating projection of the bolt can protrude out of the base through an opening in the wall. The aforesaid one component can be the first component mentioned above that exhibits the latching projection.

The latching projection and a base plate of the one component can then together border a groove, into which the base engages so as to guide the movement between the locking position and resting position. In order to enable the release of the bolt, a hinge, in particular a film hinge, can be formed between the base plate and bolt. The film hinge can in particular be flexible in design, so as to impinge on the lock in the locking position.

The spring is preferably designed as a single part with the one component. In order to simplify the structural design, and hence the manufacture, of the aforesaid one component, the opening and latching projection can be arranged between the bolt and the spring. A component joined—preferably as a single piece—with the base can exhibit a longitudinal edge oriented transverse to the mating direction and transverse to the direction of movement between the resting position and locking position, and its distance from another part can be adjusted by means of the latching connection. In particular, the component joined with the base can be a trim, a blind or a cover profile on a motor vehicle body.

BRIEF DESCRIPTION OF THE DRAWINGS

The present disclosure will hereinafter be described in conjunction with the following drawing figures, wherein like numerals denote like elements.

FIG. 3 is a perspective view of the first component and base of the latching connection;

FIG. 4 is a perspective view of the base and first component in the inserted state;

FIG. 5 is an alternative configuration of the first component;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
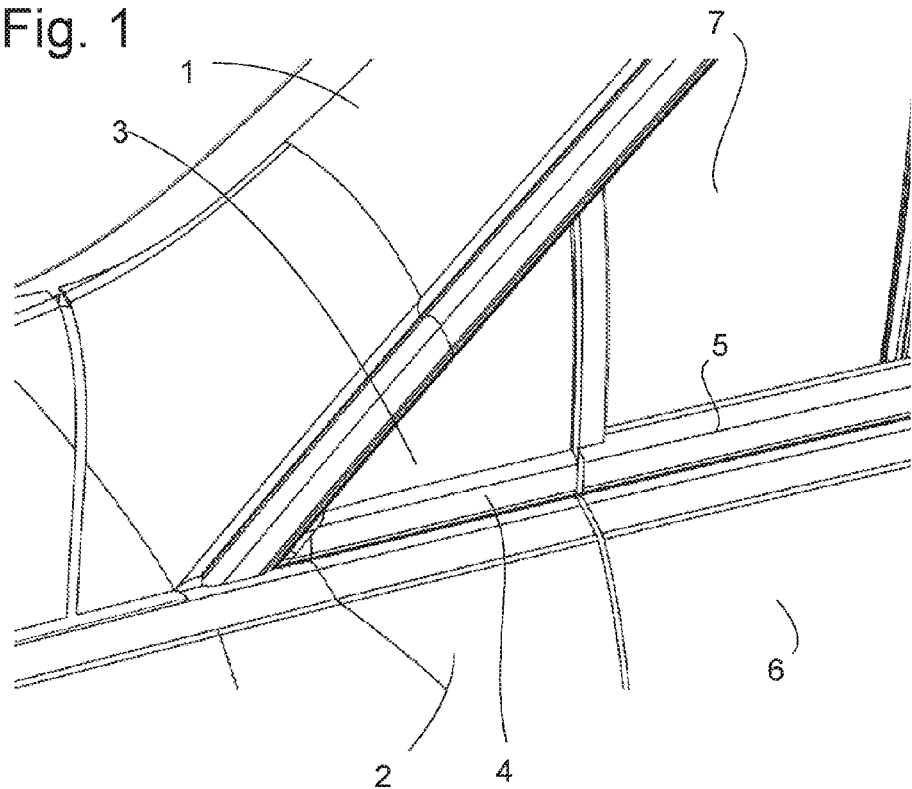
FIG. 1 is a detail of a motor vehicle body with components, which are suitable for anchoring with the help of the latching connection according to the present disclosure.

As an exemplary application of the present disclosure, FIG. 1 shows a cutout of a motor vehicle body with an A-pillar 1, a fender 2 and a blind 3, which is mounted in a gusset between the A-pillar that steeply inclines toward the back in the longitudinal direction of the vehicle and a horizontal upper edge of the fender 2. A profile 4 at the lower edge of the blind 3 abuts smoothly against the upper edge of the fender 2, and thereby evenly elongates a door weather strip 5 that extends between an outer door panel 6 and a pane 7 of the door.

Figure 2:
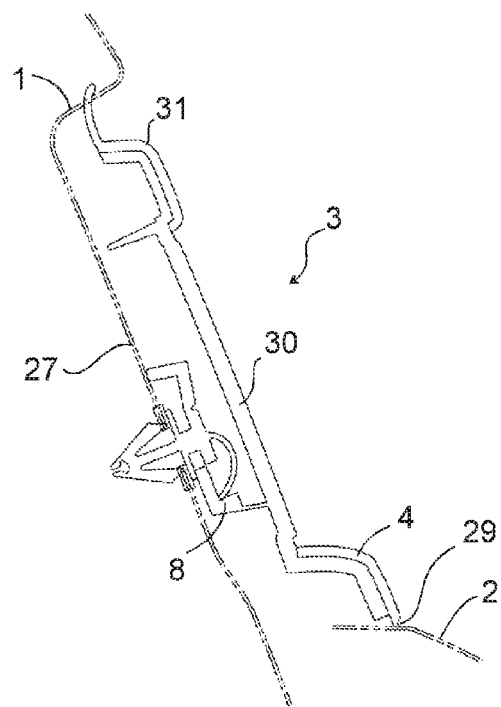
FIG. 2 is the components depicted on FIG. 1 in a schematic cross section.

FIG. 2 shows the blind 3 in a schematic cross section, whose section plane reaches upward until into the A-pillar 1 and downward until into the fender 2. The blind encompasses a base plate 30 injection molded out of plastic, onto whose interior a box-shaped base 8 of a latching connection described in even greater detail below is molded. The profile 4 is splashed onto the exterior of the base plate 30, and consists of a more flexible plastic than the base plate 30. Its lower edge contacts the fender 2. A profile 31 is splashed onto the upper edge of the base plate 30, and protrudes far enough over the latter to form an elastically compressed sealing lip in contact with the A-pillar 1.

FIG. 3 presents a perspective view of the base 8 and a first component 13 of the latching connection. The base 8 is essentially shaped like a box that sticks out from the base plate 30. The base plate 30 itself is not shown on FIG. 3, which is why the side of the box facing it appears to be open. A slit 10 extends into a wall 9 of the base 8 facing away from the base plate 30 over a majority of its length. The slit 10 is open edged toward an end face 11 of the base 8. A cross slit 12 crosses the slit 10 shortly before the end face 11.

A first component 13 of the latching connection is injection molded as a single piece out of plastic. It encompasses a rectangular base plate 14 and a latching projection 15 that rises from the base plate 14. The latching projection 15 encompasses two elastically deflectable, upwardly converging flanks 16, whose lower end is provided with a respective undercut 18 via a stop flange 17.

A groove 19 extends between the stop flange 17 and base plate 14 on both sides of a shaft, which joins the base plate 14 and stop flange 17 and is largely concealed by the stop flange 17 on FIG. 3, and its width is dimensioned corresponding to the thickness of the upper wall 9 in such a way that, during insertion of the first component 13 with the base 8, it engages into the groove 19 and guides the insertion movement along the slit 10.

FIG. 4 shows the first component 13 in a state inserted into the base 8.

A spring 20 sticks out from the base plate 14 in relation to the insertion direction toward the front. The spring 20 is fabricated as a single piece with the base plate 14 out of plastic, but with less of a material thickness than the latter so as to achieve the necessary elasticity.

The spring 20 can vary in shape; on FIG. 3, it is shaped like an arc that initially branches downwardly away from the base plate 14, and then pivots forward in the insertion direction. In a variant shown on FIG. 5, the spring 20 extends in a zigzag pattern from a front edge of the base plate 14 toward the front. The variant on FIG. 3 is preferred, since this spring 20 can reach a higher spring constant by virtue of its higher width on the one hand, and on the other hand, because it is linked with the base plate 14 beyond the front edge, it can exhibit a longer length in the insertion direction, and correspondingly also enables a larger stroke.

A bolt 22 is molded onto a rear edge of the base plate 14 via a film hinge 21. The bolt 22 is essentially plate shaped, with a upper side 23 that evenly lengthens the upper side of the base plate 14 in the relaxed state of the film hinge 21, as shown on FIG. 5, and after the upper side 23, an inclined surface 24 that ascends toward the back, from which an actuating projection 25 rises. During insertion into the base 8, the inclined surface 24 is initially pressed downward—in relation to the perspective on FIGS. 3 to 5—while in contact with the upper wall 9, so that the bolt 22 twists elastically downward in the film hinge 21, as may be seen on FIG. 3, and the inclined surface 24 slips into the base 8, and can finally latch into the cross slit 12 from below.

Figure 6:
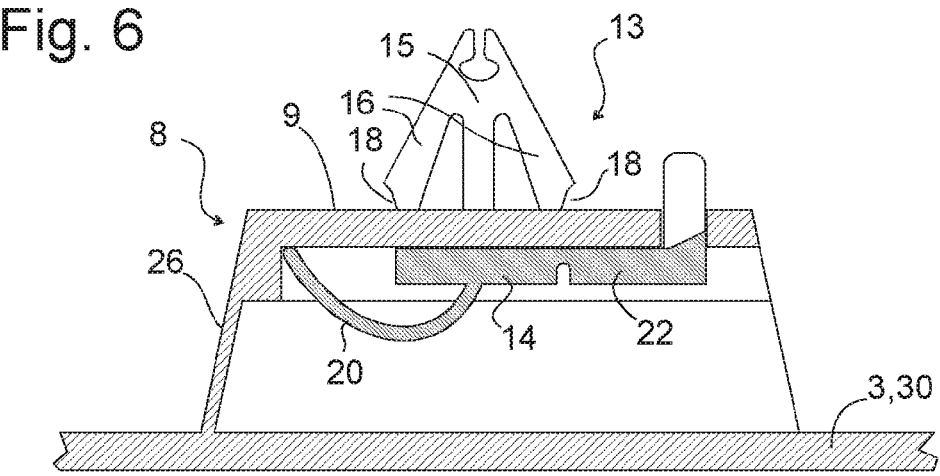
FIG. 6 is a longitudinal section through the base and the first component mounted and locked thereon.
Figure 7:
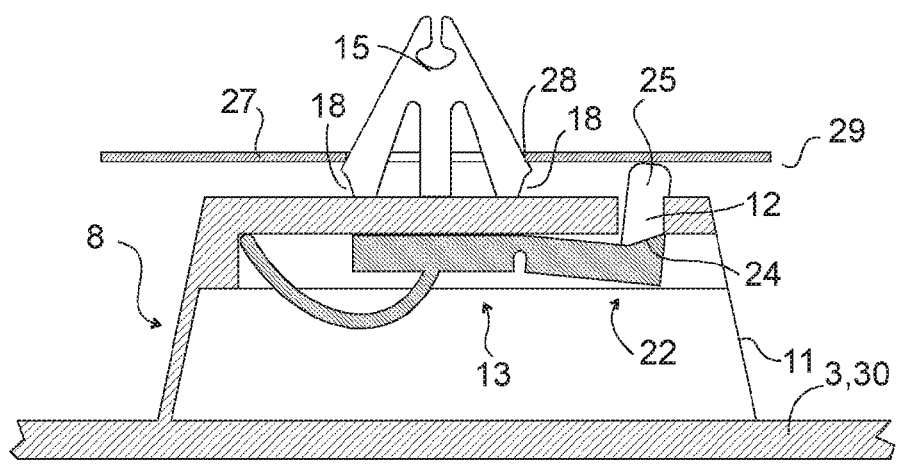
FIG. 7 is the placement of the second component on the first in a longitudinal section similar to FIG. 6.

FIG. 6 shows this latched-in state in a longitudinal section through the base 8 and first component 13 along a plane parallel to the slit 10. The spring 20 engages into a corner between the wall 9 and a rear end wall 26 of the base 8, and is exposed to an elastic stress.

Figure 8:
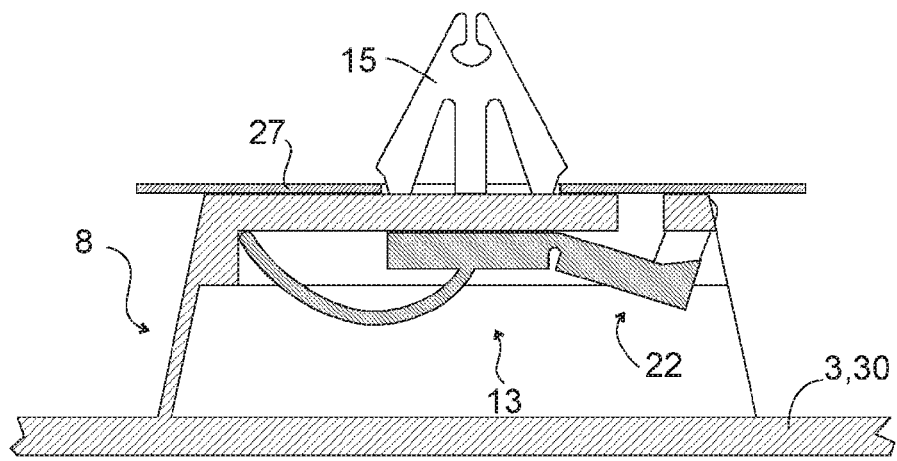
FIG. 8 is the first and second components in the resting position in a longitudinal section similar to FIG. 6.

On FIG. 2, a second component 27 of the latching connection is formed by a leg of an outer wall panel of the A-pillar 1 extending behind the blind 3. An opening 28 of this second component 27 is dimensioned in such a way that, while inserting the latching projection 15, its legs 16 are pressed elastically against each other, and finally latch into their undercuts 18. However, before the component 27 reaches the undercut 18, it impacts the actuating projection 25 and forces the latter back, so that the inclined surface 24 slips out of the cross slit 12. As long as the blind 3 is still being held by the hand of an employee or by a robot while being pressed against the body, the spring cannot relax. However, as soon as the blind 3 is released, the spring 20 again pushes the component 13 at least partially out of the slit 10 toward the end face 11, as depicted on FIG. 8, until the position on FIG. 2 has been reached, in which contact between a longitudinal edge 29 of the profile and the adjacent fender 2 stops any continued movement of the profile 4 and components 13, 27, and the profile 4 smoothly adjoins the fender 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:
1. A self-adjusting latching connection comprising:
a first component having a latching projection;
a second component having an opening into which the latching projection is insertable in a mating direction and latched in a final position;
a base, on which one of the first and second components is movably guided transverse to the mating direction between a resting position and a locking position, the base defining a first slit in a wall of the base and a second slit defined in the wall of the base that crosses the first slit;

a spring acting on the one of the first and second components in the direction of the resting position; and a bolt that detachably fixes the one of the first and second components in the locking position, the bolt coupled to the latching projection by a hinge, the bolt including a side coupled to the hinge and an inclined surface coupled to the side, and the inclined surface latches into the second slit in the locking position.

2. The self-adjusting latching connection according to claim 1, wherein the bolt is shiftable in the mating direction in order to release the one of the first and second components from the locking position.

3. The self-adjusting latching connection according to claim 1, wherein the other one of the first and second components is shaped so as to shift the bolt while inserting the latching projection into the opening.

4. The self-adjusting latching connection according to claim 1, wherein the one of the first and second components is guided in the first slit in the wall of the base.

5. The self-adjusting latching connection according to claim 4, wherein the slit is open toward one end face of the base, and the one of the first and second components is insertable into the first slit via the end face.

6. The self-adjusting latching connection according to claim 4, wherein the bolt comprises an actuating projection which protrudes from the base through the first slit in the wall of the base.

7. The self-adjusting latching connection according to claim 1, wherein the latching projection is coupled to a base plate of the one of the first and second components, and the latching projection and the base plate border a groove into which the base engages.

8. The self-adjusting latching connection according to claim 7, wherein the hinge is formed between the base plate and bolt.

9. The self-adjusting latching connection according to claim 8, wherein the hinge comprises a film hinge.

10. The self-adjusting latching connection according to claim 1, wherein the spring and the one of the first and second components is a single part.

11. The self-adjusting latching connection according to claim 1, wherein the opening and the latching connection are arranged between the bolt and the spring.

12. The self-adjusting latching connection according to claim 1, wherein a component joined with the base exhibits a longitudinal edge oriented transverse to the mating direction and transverse to the direction of movement between the resting position and locking position.

13. The self-adjusting latching connection according to claim 1, wherein a component joined with the base is at least one of a trim, a blind or a cover for a motor vehicle body.

14. A self-adjusting latching connection comprising:
a first component having a latching projection;
a second component having an opening into which the latching projection is insertable in a mating direction and latched in a final position;
a base, on which the first component is movably guided transverse to the mating direction between a resting position and a locking position, the base defining a first slit in a wall of the base and a second slit defined in the wall of the base that crosses the first slit;
a spring acting on the first component in the direction of the resting position;
a base plate coupled to the spring and the latching projection; and
a bolt that detachably fixes the first component in the locking position, the bolt coupled to the base plate by a hinge, the bolt including a side coupled to the hinge, an inclined surface coupled to the side and an actuating projection, the inclined surface latches into the second slit in the locking position and the actuating projection protrudes from the base through the first slit in the wall of the base, the actuating projection movable relative to the base to release the inclined surface from the second slit in the final position.

* * * * *